United States Patent [19]

Aman

[11] Patent Number: 4,719,590
[45] Date of Patent: Jan. 12, 1988

[54] APPARATUS AND METHOD FOR PERFORMING ADDITION AND SUBTRACTION

[76] Inventor: James A. Aman, Box 336, Cathcart Rd., Gwynedd Valley, Pa. 19437

[21] Appl. No.: 640,736

[22] Filed: Aug. 14, 1984

[51] Int. Cl.$^4$ .............................................. G06F 7/50
[52] U.S. Cl. ...................................... 364/768; 364/784
[58] Field of Search .............. 364/768, 769, 770, 778, 364/783, 784, 786, 787, 780–781, 788

[56] References Cited

U.S. PATENT DOCUMENTS

| | | | |
|---|---|---|---|
| 3,188,453 | 6/1965 | Schneider | 364/787 |
| 3,604,910 | 9/1971 | Kearns | 364/769 |
| 3,694,642 | 9/1972 | Grannis | 364/769 |
| 3,993,891 | 11/1976 | Beck et al. | 364/787 |
| 4,138,731 | 2/1979 | Kamimoto et al. | 364/787 |
| 4,163,211 | 7/1979 | Miura | 364/787 |
| 4,464,729 | 8/1984 | Mlyneck | 364/787 |
| 4,504,924 | 3/1985 | Cook et al. | 364/787 |

OTHER PUBLICATIONS

H. Ling, "High Speed Binary Parallel Adder", IEEE Transactions on Electronic Computers, pp. 799–802 (1966).

H. Ling, "High Speed Binary Adder", IBM Journal of Research and Development, vol. 25, No. 3, pp. 156–160, May 1981.

J. Sklansky, "An Evaluation of Several Two-Summand Binary Adders", IRE Transactions on Electronic Computers, pp. 213–226 (Jun. 1966).

Primary Examiner—Gary V. Harkcom
Assistant Examiner—Long Thanh Nguyen
Attorney, Agent, or Firm—Caesar, Rivise, Bernstein, Cohen & Pokotilow, Ltd.

[57] ABSTRACT

Apparatus and method for performing a mathematical operation, e.g., addition on two signals composed of a string of n digits or bits in a number system having a predetermined base wherein $A_i$ and $B_i$ represents each digit in the respective strings and with i being the specific column or bit number from 0 to n. The mathematic operation is performed by first circuitry on the $A_i$ and $B_i$ digits without reference to the results of that operation of any other column or bit number. Substrings of the B string are compared by second circuitry to corresponding substrings of C string which for addition is the base minus one complement of the A string. Third circuitry are provided responsive to the first and second circuitry to produce a resultant output signal composed of at least n digits representing the results of the mathematic operation.

15 Claims, 7 Drawing Figures

APPARATUS AND METHOD FOR PERFORMING ADDITION AND SUBTRACTION

BACKGROUND OF THE INVENTION

This invention relates generally to computers and computation equipment and more particularly to devices and methods for accomplishing high speed mathematical operations.

As is known, one of the primary building blocks of any digital computer or computing means is the ALU circuit. That circuit employs a binary adder composed of plural gates forming a half-adder circuit and at least one full-adder cirucit. As is known, a conventional half-adder circuit is a logic circuit for adding a pair of single bits and most commonly consists of a two input EXCLUSIVE OR gate and a two input AND gate. The gates are connected so that one bit is provided to one input of each gate while the other bit is provided to the other input of each gate. The output of the EXCLUSIVE OR gate is the signal equal to the "sum" of the two bits without carry while the output of the AND gate is the "carry" bit. Since a half-adder can only add two bits at a time a full adder is required to add three or more bits. Thus, a full-adder for three bits consists of a three input EXCLUSIVE OR gate, each of whose inputs is provided with a respective bit to be added. The full-adder also includes three, two input AND gates. The inputs of one AND gate is provided with the first and second bits to be added, while the inputs of the second AND gate are provided with the first and third bits to be added and the inputs of the third AND gate are provided with the second and third bits to be added. The output of the three AND gates are provided as respective inputs to an OR gate. In such an arrangement the EXCLUSIVE OR gate provides the "sum" bit while the OR gate provides the "carry" bit.

In order to form a binary adder circuit to add two multibit binary numbers plural full-adder circuits are connected in cascade with each other and with a half-added. As will be appreciated by those skilled in the art, with such an arrangement, before each successive stage of the binary adders can effect the addition of its bits, the carry bit for the preceding stage must be known (i.e., determined). This factor, (referred to frequently as "carry bit propogation"), renders binary addition and subtraction, a serial process, with the time necessary to complete the mathematical operation being a function of the number of stages in the binary adder. Since multiplication and division are effected as a function of addition/subtraction, carry bit propogation is thus a factor in the speed of operation of circuits for performing those operations also.

In order to overcome the time wastage problems of carry bit propogation, so as to result in faster circuits for performing mathematical functions, various techniques have been disclosed to determine the content of each carry bit prior to the combination (e.g., addition) of the bits producing that carry bit. Such techniques are frequently referred to as carry bit "look-ahead" techniques. An example of a carry bit look-ahead technique is shown in U.S. Pat. No. 3,604,910 (Kearns) and in the following literature: H. Ling, "High Speed Binary Parallel Adder", IEEE Transactions on Electronic Computers, pp. 799-802 (1966); H. Ling, "High Speed Binary Adder", IBM Journal of Research and Development, Vol. 2W5, No. 3, pp. 156-160, May 1981; J. Sklansky, "An Evaluation of Several Two-Summand Binary Adders", IRE Transactions on Electronic Computers, pp. 213-226 (June 1966), and Texas Instruments Incorporated Data Book; p. 393, "Types SN54182 and SN74182 Look-Ahead Carry Generators".

While prior art carry bit look-ahead techniques may result in a speed improvement over a conventional circuits, they nevertheless leave much to be desired from the standpoint of simplicity of construction, e.g., require large n-input devices, and effectiveness of operation.

OBJECT OF THE INVENTION

Accordingly, it is a general object of the instant invention to provide a device and method for accomplishing mathematical operations and which overcomes the disadvantages of the prior art.

It is a further object of the instant invention to provide a device and method for accomplishing a mathematical operation on n digit (e.g., bit) signals in a period of time which is independent of n.

It is another object of the instant invention to provide a device and method for performing mathematical operations on signals representing numbers in any number system.

It is still a further object of the instant invention to provide a device and method for performing mathematical operations on plural, multi-digit signals representing numbers in any number system, by utilizing digit comparison techniques.

SUMMARY OF THE INVENTION

These and other objects of the instant invention are achieved by providing a device for performing a mathematical operation on two signals A and B, each of which being composed of a string of n digits in a number system having a predetermined base, with each digit defining a respective column, and wherein $A_i$ represents each digit of the A string, $B_i$ represents each digit of the B string and i represents the specific column number from 0 to n of the string. The device comprises the first means for performing a mathematical operation on the $A_i$ and $B_i$ digits in each of the columns without reference to the result of said operation in any other column. The device also includes second means for comparing substrings of the B signal to the corresponding substrings of a C string of n digits. The C string has a predetermined relationship to the A string. Third means are also provided responsive to the first and second means for providing a resulting output signal, R, composed of at least n digits $R_i$, and representing the results of the mathematic operation.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
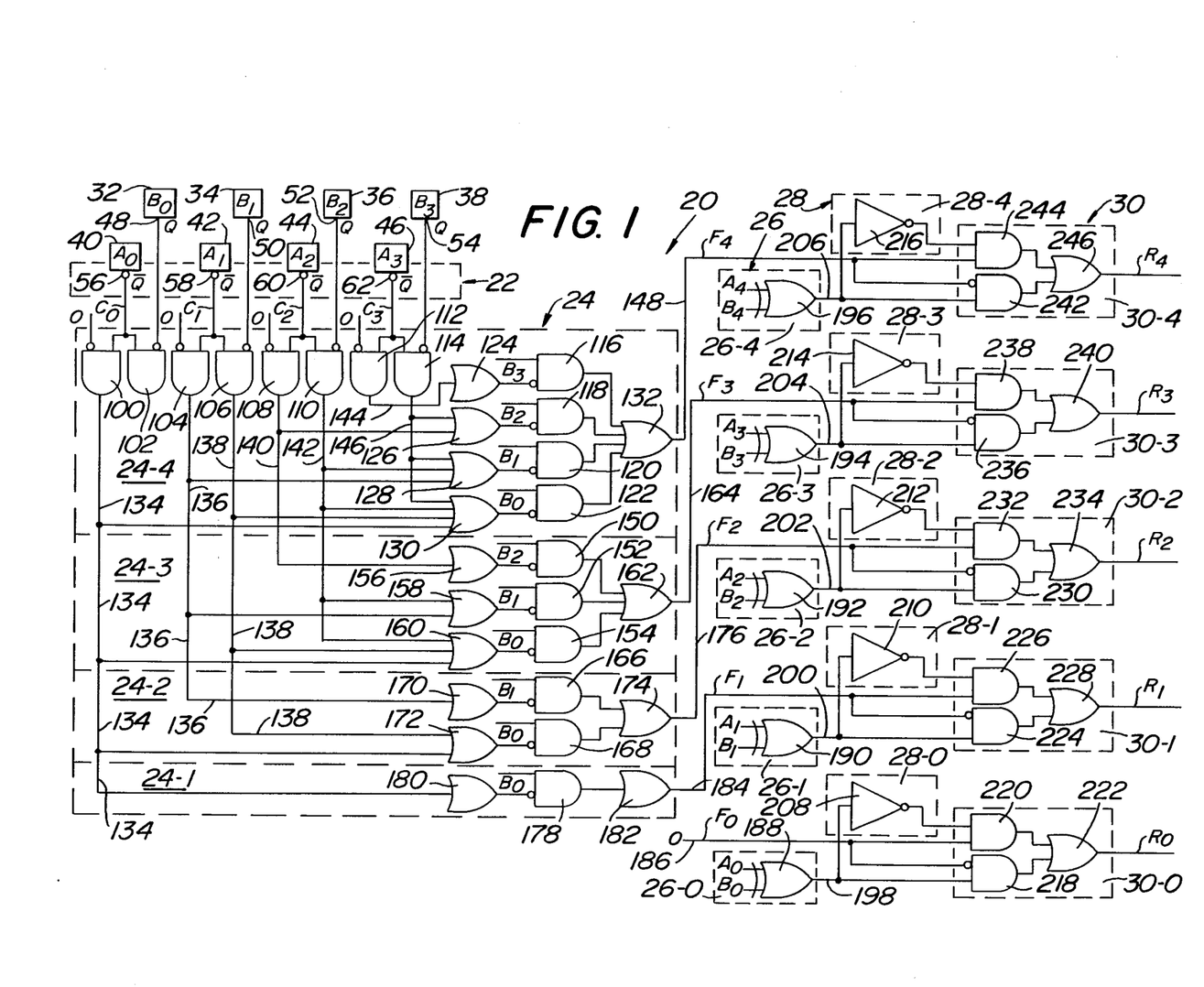
FIG. 1 is a schematic diagram of a circuit for adding two, four bit binary numbers constructed in accordance with the instant invention.

Referring now to various figures of the drawing wherein like reference characters refer to like parts, there is shown at 20 in FIG. 1 means for performing a mathematical operation on two, four bit binary signals. In accordance with the teachings of this invention a technique is provided for performing any mathematical operation, such as addition, subtraction, on any multi-bit or multi-digit number, irrespective of the number system used. That technique is based on a generalized procedure which effects what can be considered a "look ahead" or predetermination of the carry digits (bits) created during the mathematical operation. Particular devices for carrying out the generalized operation of this invention can take many forms, e.g., digital circuitry, and can be used in any numbering system, e.g., binary, decimal, octal, etc.

The circuitry 20 shown generally in FIG. 1 represents a four bit binary adder and is shown and described herein for exemplary purposes only. Thus, the circuitry 20 basically comprises complementer means 22, comparison means 24, mathematical operation performing means 26 and 28, and selector means 30. The aforementioned means, are connected so as to effect the addition of two n bit binary signals A and B. In the embodiment shown n is equal to 4 and each bit of the A signal is designated by the notation $A_i$, where i represents the bit number. Each bit of the B signal is also designated by the same notation, so that $B_i$ represents the particular bit of the B signal.

The circuitry 20 operates in two steps. One step which is performed by complementer means 22 and comparison means 24 entails the determination of whether or not the B signal and all its components substrings of bits is greater than the A signal and its corresponding substrings of bits. It should be pointed out at this juncture that the term substring as used herein means the string of bits from the ith bit to the lowest order (0) bit. Thus, in the embodiment shown in FIG. 1 each of the A and B signals consists of four substrings, namely the entire string from i=3 to i=0, the substring from i=2 to i=0, the substring from i=1 to i=0 and the substring i=0.

The string/substring comparison process is accomplished by comparator means, which in accordance with the preferred embodiment of the subject invention, are constructed in accordance with the teachings of my copending U.S. patent application Ser. No. 06/656,054 filed on Sept. 28, 1984 and entitled "Comparator". That comparator means is arranged to determine whether one binary signal is greater than another, with such comparison being made completely independent of the number of bits in the signals being compared.

The comparator means 24 basically comprises four substrings comparators, namely a one bit substring comparator 24-1, a two bit substring comparator 24-2, a three bit substring comparator 24-3 and a four bit substring comparator 24-4. As it will be described in considerable detail later each of the substring comparator circuits is arranged to determine whether the associated substring of the B signal is greater than the corresponding substring of a C signal or whether said B substring is less than or equal to the C signal.

As will be described in considerable detail later the C signal constitutes the base minus one complement of the A substring, wherein the term "base" means the base of the number system utilized. Thus, when the system 20 is utilized for binary numbers, such that the base=2, the comparator 24-1 to 24-4 compares all of the B substrings to a corresponding C string representing the "ones" complemented A substrings. The means for effecting the complementing of the A signal to produce the C signal is the heretofor described means 22. In the embodiment shown in FIG. 1 the means 22 comprise the $\overline{Q}$ outputs of registers holding the respective bits of the A string as will be described later.

The mathematic operation performing means 26 comprises a plural half-adder without carry circuits, namely circuits 26-0, 26-1, 26-2, 26-3, and 26-4. The details of circuits 26-0 to 26-4 will be described in detail later. Suffice for now to state that each circuit is arranged to take the associated $A_i$ and $B_i$ bits of the respective A and B strings and to produce an output signal equal to their sum without any carry bit. In particular circuit 26-0 sums the $A_0$ and $B_0$ bits, circuit 26-1 sums the $A_1$ and $B_1$ bits, circuit 26-2 sums the $A_2$ and $B_2$ bits, circuit 26-3 sums the $A_3$ and $B_3$ bits and circuit 26-4 sums the $A_4$ and $B_4$ bits. The outputs of the half-adder circuits 26-0 to 26-4 are provided as respective inputs to associated selectors of the selector means 30 and to the other mathematic operation performing means 28. That other mathematic performing means 28 basically comprises plural circuits 28-0, 28-1, 28-2, 28-3, and 28-4. Each of those circuits is arranged to increment by one the output of the associated half-adder circuit. In the embodiment of the system 20 shown hereinafter the incrementing by one of the binary output signal from the associated half-adder is accomplished by the use of an inverter as the means 28.

The output of each of the inverters 28-0 to 28-4 is provided as a second input to the associated selector means 30. In particular, selector means 30 comprises plural selectors 30-0, 30-1, 30-2, 30-3, and 30-4. The details of the selectors 30-0 to 30-4 will also be described in detail later. Suffice for now to state that each selector is arranged to provide at its output either the signal representing the sum of $A_i$ and $B_i$ (as provided by the associated half-adder 26) or that sum incremented by one (as provided by the associated inverter 28), with the selection being made as a function of the output of the associated substring comparator circuit 24. Thus, the output of each substring comparator is a signal $F_i$ and which is provided as the control input to the associated selector means. In particular the output signal $F_4$ of comparator 24-4 is provided as the control input to selector 30-4, the output signal $F_3$ of comparator 24-3 is provided as the control input to selector 30-3, the output signal $F_2$ of comparator 24-2 is provided as the control input to selector 30-2, and the output signal $F_1$ of comparator 24-1 is provided as the control input to selector 30-1. The control input signal $F_0$ for selector 30-0 is always provided with a low or zero bit.

The output of all of the selectors 30 constitutes a signal designated as R, with each selector providing the ith component of that output signal representing the resultant of the mathematical operation performed by the circuit 20 on input signals A and B. Thus, in the embodiment shown herein, selector circuits 30-0 to 30-4 provide respective output bits $R_0$ to $R_4$ representing the sum of signals A and B.

The details of the circuitry 20 shown in FIG. 1 will now be described. As can be seen each of the bits of B signal is stored in a respective register or flip flop and each bit of the A signal is also stored in a respective register or flip flop. In particular bits $B_0$, $B_1$, $B_2$ and $B_3$ are stored in registers 32, 34, 36 and 38 respectively. In a similar manner the $A_0$, $A_1$, $A_2$ and $A_3$ bits of the A signal are stored in registers 40, 42, 44 and 46, respectively. The $B_0$ bit is provided on the Q output 48 of register 32, the $B_1$ bit is provided on the Q output 50 of register 34, the $B_2$ bit is provided on the Q output 52 of register 36 and the $B_3$ bit is provided on the Q output 54 of register 38.

As noted earlier, the complementor 22 serves as the means for providing the C signal, i.e., the complement of the A signal for use by the substring comparator means 24. The complementor 22 for the circuits shown in FIG. 20 is a one's complementor. That function is achieved by providing the respective A bit on the complemented or $\overline{Q}$ output of each of the registers 40-46. In particular the $\overline{Q}$ output 56 of register 40 provides an output bit $C_0$ which is the one's complement of the $A_0$ bit. In a similar manner the $\overline{Q}$ output 58 of the register 42 provides the $C_1$ bit which is the one's complement of the $A_1$ bit, the $\overline{Q}$ output 60 of register 44 provides the a $C_2$ bit which is the one's complement of the $A_2$ bit, and the $\overline{Q}$ output 62 of register 46 provides output bit $C_3$ which is the one's complement of bit $A_3$. The digital signals $B_0$ to $B_3$ and the signals $C_0$ to $C_3$ are provided as respective inputs to the substring comparators 24.

The substring comparator circuit 24-4 comprises twelve 2-input AND gates 100, 102, 104, 106, 108, 110, 112, 114, 116, 118, 120, and 122, a one input OR gate 124, a two input OR gate 126, a three input OR gate 128, a four input OR gate 130 and a four input OR gate 132. One input of AND gates 100 and 102 are connected together to $\overline{Q}$ output 56 of register 40. The other input to AND gate 100 is an inverted input and is connected to a logic low (0) signal. The other input to AND gate 102 is also an inverted input and is connected to the Q output 48 of the register 32. Two inputs of AND gates 104 and 106 are connected together to $\overline{Q}$ output 58 of the register 42. The other of the inputs to AND gate 104 is an inverted input and is also connected to a logical low signal. The other input to AND gate 106 is an inverted input and is connected to the Q output 50 of the register 34. Two inputs of AND gates 108 and 110 are connected together to the Q output 60 of register 44. The other input of AND gate 108 is also an inverted input and is connected to a logical low signal. The other input to AND gate 110 is also an inverted input and is connected to the Q output 52 of register 36. One of the inputs of AND gate 112 and one of the inputs of AND gate 114 are connected together to the $\overline{Q}$ output 62 of register 46. The other input to AND gate to 112 is also an inverted input and is connected to a logical low signal. The other input to AND gate 114 is also an inverted input and is connected to the Q output 54 of register 38. The output of AND gates 100, 104, 106, 108, 110, 112, and 114 are connected to lines 134, 136, 138, 140, 142, 144, and 146, respectively.

As can be seen line 134 serves as one input to the four input OR gate 130 and to each of the remaining substring comparator circuits 24-3, 24-2, and 24-1. The line 136 serves as one input to the three input OR gate 128 and to the substring comparators 24-3 and 24-2. The line 138 is connected as a second input to the four input OR gate 130 and to the substring comparator circuits 24-3 and 24-2. The line 140 is connected as one input to the two input OR gate 126 and to the substring comparator 24-3. Line 142 is connected as a second input to the two input OR gate 128, a third input to the four input OR gate 130, and to substring conparator 24-3. Line 144 is connected to the one input of the OR gate 124. Line 146 is connected to the second input to the two input OR gate 126, to the third input of the three input OR gate 128, and to the fourth input of the four input OR gate 130.

The output of OR gates 124, 126, 128 and 130 are provided as inverted inputs to AND gates 116, 118, 120 and 122, respectively. The other input to AND gate 116 is provided with a signal corresponding to the $B_3$ bit. The other input of AND gate 118 is provided with a signal corresponding to the $B_2$ bit. The other input of the AND gate 120 is provided with a signal corresponding to the $B_1$ bit, and the other bit of the AND gate 122 is provided with a signal corresponding to the $B_0$ bit. The output of each of the AND gates 116, 118, 120 and 122 are provided as respective inputs to the four input OR gate 132. The output of OR gate 132 is provided by line 148 and constitutes the heretofor identified $F_4$ bit.

The substring comparator circuit 24-3 basically comprises three, two input AND gates 150, 152 and 154, a one input OR gate 156, a two input OR gate 158, a three input OR gate 160 and another three input OR gate 162. As can be seen line 134 is connected to one input of the three input OR gate 160, line 136 is connected as one input to the two input OR gate 158 and line 138 is connected as a second input to the three input OR gate 160. Line 140 is connected as the single input to the one input OR gate 156 and line 142 is connected as the second input to the two input OR gate 158 as well as the third input to the three input OR gate 160.

The output of OR gates 156, 158, and 160 are provided to inverted inputs of AND gates 150, 152 and 154 respectively. The other input to AND gate 150 is a non-inverted input and is provided with a signal corresponding to the $B_2$ bit. The other input of AND gate 152 is a non-inverted input and is provided with a signal corresponding to the $B_1$ bit. The other input of AND gate 154 is a non-inverted input and is provided with a signal corresponding to the $B_0$ bit. The output of AND gates 150, 152 and 154 are connected to respective inputs of the OR gate 162. The output of OR gate 162 is connected to line 164, which line serves to carry $F_3$ signal.

The substring comparator 24-2 basically comprises two, two input AND gates 166 and 168, a one input OR gate 170, a two input OR gate 172 and another two input OR gate 174. Line 134 is connected as one input to the two input OR gate 172. Line 136 is connected as the only input to one input OR gate 170 and line 138 is connected as the second input to two input OR gate 172.

The output of OR gates 170 and 172 are connected to inverted inputs of AND gates 166 and 168, respectively.

The other input of AND gate 166 is a non-inverted input and is provided with a signal corresponding to the $B_1$ bit. The other input of AND gate 168 is a non-inverted input and is provided with a signal corresponding to the $B_0$ bit. The output of AND gates 166 and 168 are connected together to the inputs of OR gate 174. The output of OR gate 174 is connected to line 176 and serves to carry the $F_2$ signal.

The substring comparator 24-1 basically comprises a two input AND gate 178, a one input OR gate 180, and another one input OR gate 182. Line 134 is connected as the sole input to OR gate 180. The output of OR gate 180 is connected to an inverted input of AND gate 178. The other input of AND gate 178 is a non-inverted input and serves to carry a signal corresponding to the $B_0$ bit. The output of AND gate 178 serves as the input of OR gate 182. The output of OR gate 182 is provided at line 184 and serves to carry the $F_1$ signal. The $F_0$ signal is provided via line 186 and always consists of a logical low (0) signal.

Each of the half-adders without carry 26-0 to 26-4 is constructed in an identical manner. To that end each circuit comprises a two input EXCLUSIVE OR (XOR) gate. In particular, circuit 26-0 is made up of XOR 188, circuit 26-1 is composed of XOR 190, circuit 26-2 is composed of XOR 192, circuit 26-3 is composed of XOR 194 and circuit 26-4 is composed of XOR 196. The two inputs to XOR 188 are provided with the signals representing the $A_0$ and $B_0$ bits. The two bits to XOR 190 are provided with signals representing the $A_1$ and $B_1$ bits. The two signals provided to XOR 192 are the two signals representing the $A_2$ and $B_2$ bits. The two signals provided to XOR 194 are the two signals representing the $A_3$ and $B_3$ bits. The two signals provided to XOR 196 are the two signals representing the $A_4$ and $B_4$ bits.

As will be appreciated by those skilled in the art an EXCLUSIVE OR gate having two binary inputs provides an output signal which is the equivalent of the sum of the two input signals without any carry bit. Thus, a signal is provided on output line 198 from XOR 188 and which constitutes the summation of $A_0+B_0$. In a similar manner line 200 (which is the output of XOR 190) provides the summation of $A_1$ and $B_1$, line 202 (which is the output of XOR 192) provides the summation of $A_2$ and $B_2$, line 204 (which is the output of XOR 194) provides the summation of $A_3$ and $B_3$, and line 206 (which is the output of XOR 196) provides the summation of $A_4$ and $B_4$.

The output lines 198, 200, 202, 204 and 206 are connected as one input to the selector circuits 30-0, 30-1, 30-2, 30-3 and 30-4, respectively. Moreover, the lines 198, 200, 202, 204 and 206 are also connected as inputs to the circuits 28-0, 28-1, 28-2, 28-3 and 28-4, respectively. As noted heretofore, each of circuits 28 is composed of an inverter. In particular, circuit 28-0 is made up of inverter 208, circuit 28-1 is made up of inverter 210, circuit 28-2 is made up of inverter 212, circuit 28-3 is made up of inverter 214, and circuit 28-4 is made up of inverter 216. The output of inverters 208, 210, 212, 214 and 216 are connected as second inputs to the selector circuits 30-0, 30-1, 30-2, 30-3 and 30-4, respectively.

As can be seen each of the selector circuits 30-1 to 30-4 are constructed in an identical manner. Thus selector 30-0 consists of a pair of two input AND gates 218 and 220 and an OR gate 222. Selector 30-1 consists of a pair of two input AND gates 224 and 226 and a OR gate 228. Selector 30-2 consists of pair of two input AND gates 230 and 232 and a two input OR gate 234. Selector 30-3 consists of a pair of two input AND gates 236 and 238 and a two input OR gate 240. Selector 30-4 consists of pair of two input AND gates 242 and 244 and a two input OR gate 246.

The lines 186, 184, 176, 164 and 148 make up the selection control inputs to the selector circuits 30-0, 30-1, 30-2, 30-3 and 30-4, respectively. To that end line 186 is connected to an inverted input of AND gate 218 and to a non-inverted input of AND gate 220. The other input to AND gate 218 is a non-inverted input and is connected to output line 198. The other input of AND gate 220 is also a non-inverted input and is connected to the output of the inverter 208. The selection control line 184 is connected to an inverted input of AND gate 224 and to a non-inverted input of AND gate 226. The other input to AND gate 224 is a non-inverted input and is connected to output line 200. The other input to AND gate 226 is also a non-inverted input and ic connected to the output of inverter 210. The selection control line 176 is connected to an inverted input of AND gate 230 and to a non-inverted input of AND gate 232. The other input of AND gate 230 is a non-inverted input and is connected output line 202. The other input of AND gate 232 is also a non-inverted input and is connected to the output of inverter 212. The selection control line 164 is connected to an inverted input of AND gate 236 and to a non-inverted input of AND gate 238. The other input of AND gate 236 is a non-inverted input and is connected to output line 204. The other input of AND gate 238 is connected to the output of inverter 214. The selection control line 148 is connected to an inverted input of AND gate 242 and to a non-inverted input AND gate of 244. The other input to AND gate 242 is a non-inverted input and is connected to output line 206. The other input of AND gate 244 is connected to the output of inverter 216.

The output of AND gates 218 and 220 serve as respective inputs to the OR gate 222, whose output provides the $R_0$ bit of the resultant signal. In the embodiment shown herein the $R_0$ signal constitutes the lowest order bit of the signal representing the summation of signals A and B. The output of AND gates 224 and 226 are provided as respective inputs to OR gate 228, whose output provides the $R_1$ bit (i.e., the next higher order bit of the signal resulting from the addition of signals A and B). The output of AND gates 230 and 232 are provided as respective inputs or OR gates 234, whose output provides the next higher order bit $R_2$ of the signal resulting from the summation of the A and B signals. The output of AND gates 236 and 238 are provided as respective inputs to OR gate 240, whose output provides the next higher order output bit $R_3$ resulting from the addition of signals A and B. The output of AND gates 242 and 244 provided as respective inputs to OR gates 246, whose output provides the highest order output $R_4$ of the signal resulting from the addition of signals A and B.

As noted earlier various other logic circuits can be utilized to effect the operation of the circuit 20 described heretofore. For example, one could utilize integrated circuits including inverted inputs for AND gates 220, 226, 232, 238 and 244 in lieu of the use of inverters 208, 210, 212, 214 and 216, respectively. So too, integrated circuits including inverters can be used to form the inverted inputs to the AND gates of this invention.

Figure 2A:
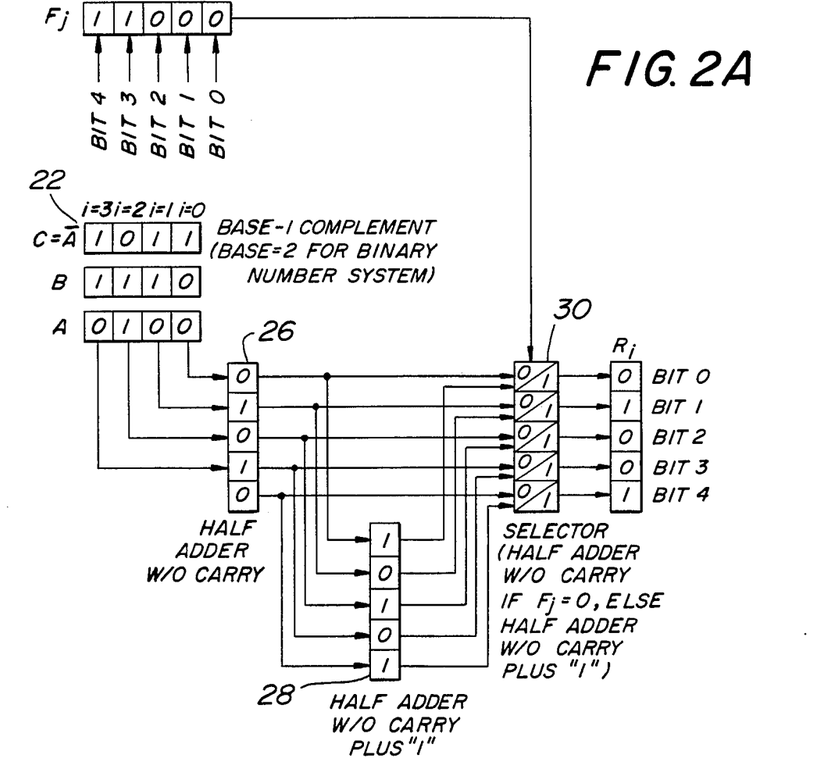
FIG. 2A is a diagram showing the addition of two, four bit binary numbers by a circuit constructed in accordance with the instant invention.

Operation of the circuit 20 of FIG. 1 is shown diagramatically in FIG. 2A. In that figure by way of example there is shown the addition of an A signal composed of four bits 0100 representing the decimal number 4 to a B signal composed of four bits 1110 representing the decimal number 14. Thus as can be seen the complementor means 22 effects the one's complement of the A signal 0100 to produce a C string 1011. The half-adder without carry means 26 effects the summation without carry of each of the bits of the A and C strings. Accordingly for i=0, the output of the half-adder without carry is 0. For i=1 the output of the half-adder without carry is 1. For i=2 the output of the half-adder without carry is 0. For i=3 the output of the half-adder without carry is 1. The highest order bit provided by the half-adder without carry is always a 0 and constitutes the signal provided on line 186 referred to heretofore. The respective bits provided by the half-adders without carry 26 are provided directly to the selectors 30 and also to the half-adders without carry plus one 28. That means thus takes the bit string 01010 produced heretofore by the half-adders without carry 26 and adds "one" to each of the bits thereof without carry. Thus, the output of means 28 constitutes the bit string 10101. This string is also provided to the selector 30.

As described earlier the selector 30 is arranged to provide either the bits from the half-adder without carry 26 or from the half-adder without carry plus one 28 to the output of the circuit 20 to produce the resultant output signal R. The control of each of the selectors of means 30 is effected by the state of the corresponding bit of the F signal provided by the substring comparator means 24. The F signal is composed of j bits, where j equals i+1 and where $F_0$ is always equal to 0.

Bits 1 to 4 of the F signal are a function of the substring comparison. Accordingly, as will be appreciated by those skilled in the art bit $F_4$ is determined by circuit 24-4 and consists of a comparison of all of the strings and substrings making up the B and C signals to determine if for each substring the B signal is greater than the C signal or else is less than or equal to the C signal. If the B string is greater than the corresponding C string the $F_j$ bit is 1, if it is less than or equal than the corresponding C string the $F_j$ bit is 0. In the example shown in FIG. 2A the string made up of all four bits of the B string (i=3) is greater than the corresponding bits of the C string whereupon $F_j=F_{i+1}=F_4=1$. In a similar manner for the substring wherein i=2 the B substring is greater than the corresponding substring so that $F_3=1$. For the substring where i=1 the B substring is less than the C substring, whereupon $F_2=0$. So too, for the substring where i=0 the B substring is less than the C substring, whereupon $F_1=0$. The resulting signal $F_j$ composed from its lowest order bit to its highest order bit of the signal 11000, means that the three lowest order bits making up the resultant output signal R, that is bits $R_0$, $R_1$ and $R_2$ are provided from the half-adder without carry and thus constitute 010. Inasmuch as the two highest order bits, namely bits $F_3$ and $F_4$ of signal F are both 1 the two highest order bits provided by the half-adder without carry plus one are provided as the two highest order bits of the resulting output signal. Hence bit $R_3$ is a 0 and bit $R_4$ is a 1. As will be appreciated by those skilled in the art the resulting binary signal 10010 represents the decimal number 18 and does, in fact, constitute the sum of signals A and B.

Figure 3A:
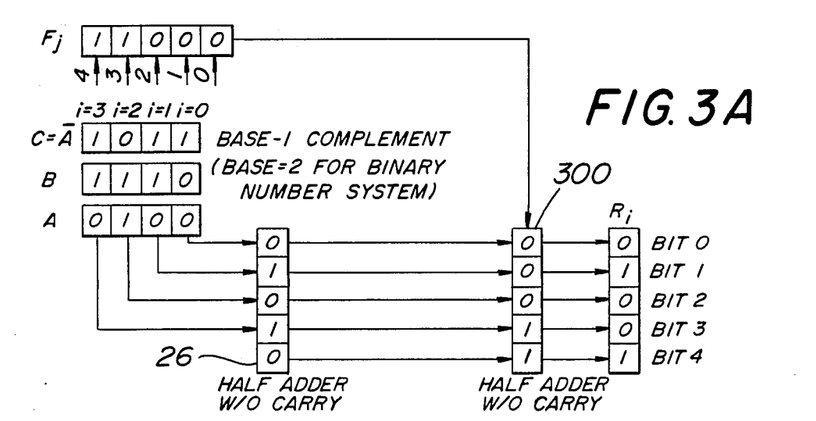
FIG. 3A is a diagram like that of FIG. 2A showing the addition of two, four bit binary numbers by an alternative embodiment of the subject invention.

An alternative construction for the circuit 20 shown in FIG. 1 is shown diagramatically in FIG. 3A. In lieu of utilizing a half-adder without carry plus one circuit 28 and a selector circuit 30, a second half-adder without carry circuit 300 is utilized to add the output of the half-adder without carry 26 to the signal F produced by the substring comparison means 24. Thus, the bits 01010 provided by the half-adder without carry circuits 26 are added to the bits 11000 provided by the substring comparison circuits 24 in the half-adder without carry means 300 to result in the output string 10010 representing the decimal number 18.

As will be appreciated by those skilled in the art the half-adder without carry circuit 300 can be constructed in a similar manner to the half-adder without carry circuit 26.

Figure 2B:
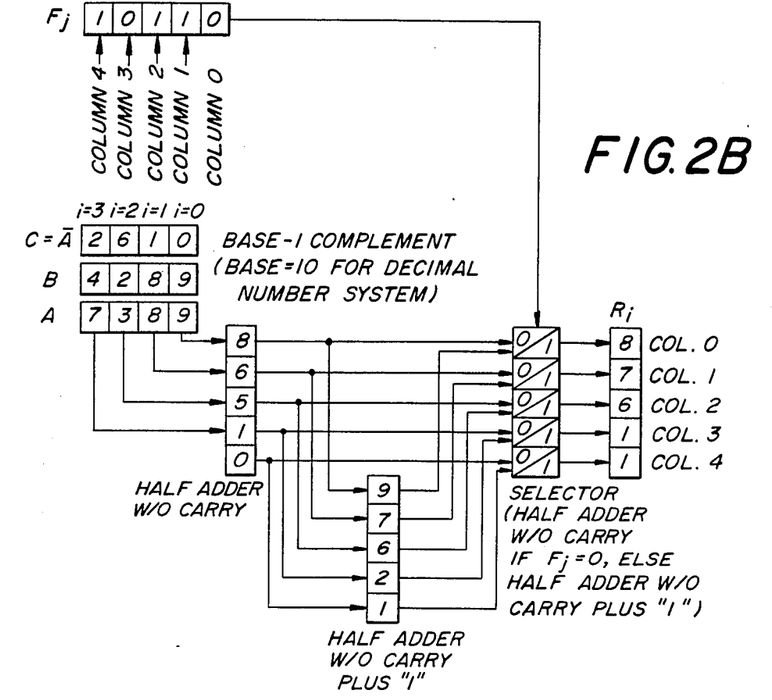
FIG. 2B is a diagram showing the addition of two, four digit decimal numbers by a circuit constructed in accordance with the instant invention.

In FIG. 2B there is shown a diagram like that of FIG. 2A but showing the operation of the invention for effecting the addition of two four digit decimal numbers. Thus, as shown therein the four digit decimal number A of 7,389 is to be added to the four digit decimal number B of 4,289. As described earlier the C signal is produced by taking the base minus one compliment of the A signal. In the example of FIG. 2B the two numbers are in the decimal such that the base equals 10. Accordingly, the C signal consists of four digits each of which being the 9's compliment of the A signal. In particular for i=3 the 9's compliment of 7 is 2. For i=2 the 9's compliment of 3 is 6. For i=1 the 9's compliment of 8 is 1 and for i=0 the 9's compliment of 9 is 0. Accordingly, the string of digits making up the C signal constitutes the digits 2610. The summation of the A and B signals without carry results in the output 01568 wherein the 8 is the least significant digit. This is accomplished by adding each of the individual $A_i$ and $B_i$ digits. To that end for i=0 the sum of $A_0$ and $B_0$ is 8. For i=1 the sum of $A_1$ plus $B_1$ is 6. For i=2 the sum of $A_2$ plus $B_2$ is 5 and for i=3 the sum of $A_3$ plus $B_3$ is 1. The most significant digit provided by the half-added without carry is always 0. The half-adder without carry plus one circuit then increments the output of the half-adder without carry by one. Accordingly, the output of the half-adder without carry plus one is the string 12679, where 9 is the least significant digit.

The selection of which digits of the two strings are to be provided in the respective columns of the output signal $R_i$ is, as described earlier, a function of the string F and which string is determined by the substring comparator means described heretofore. Accordingly, for column 4 that is where j=4 the i=3 substring of B is greater than the corresponding substring of C so that $F_4$ equals 1. In a similar manner $F_3$ is 0 inasmuch as the i=2 substring of B is less than the corresponding substring of C. In a similar manner $F_2$ is equal to 1 inasmuch as the i=1 substring of B is greater than the corresponding substring of C. So too, the $F_1$ digit is also a 1 since the i=0 substring of B is greater than the corresponding substring of C. The column 0 digit, that is the digit $F_0$, as described earlier is always 0. Thus, for the example shown in FIG. 2B the string F is 10110. That being the case, for the lowest order digit, $R_0$ equals the output of the half-adder without carry, namely, 8. For R=2, since $F_2=1$, the output of the half-adder without carry plus one is selected, namely, the digit 7. For $R_3$ the output of the half-adder without carry is also used since $F_3=1$. For R=3 the out of the half-adder without carry is selected since $F_3$ is 0. Finally for R=4 the output of the half-adder without carry plus 1 is selected since $F_4=1$. As will be appreciated, the number 11678 does represent the sum of the A signal 7389 and the B signal 4289.

Figure 3B:
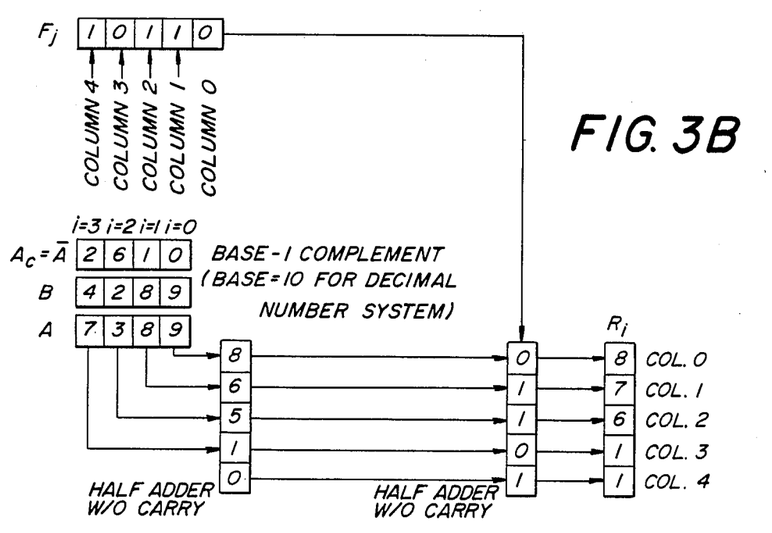
FIG. 3B is a diagram like that of FIG. 3A showing the addition of two, four digit decimal numbers by an alternative embodiment of the subject invention.

In FIG. 3B there is shown a diagram similar to that of FIG. 3A but showing the addition of the two, four digit decimal numbers utilizing the technique of two half-adders without carry, that is utilizing a second half-adder without carry, to add the digits of the F signal to the output of the half-adder without carry which adds the A and B signals.

As mentioned earlier the subject invention can also be utilized to effect the subtraction of one signal from another. To that end the subtraction of a B signal from an A signal is accomplished for binary numbers by the circuitry of FIG. 1 but without complementing the A signal to provide the C signal. In such a case the A and C signals are one and the same and are thus provided by the Q outputs of the respective registers storing the A signal bits therein.

Figure 4:
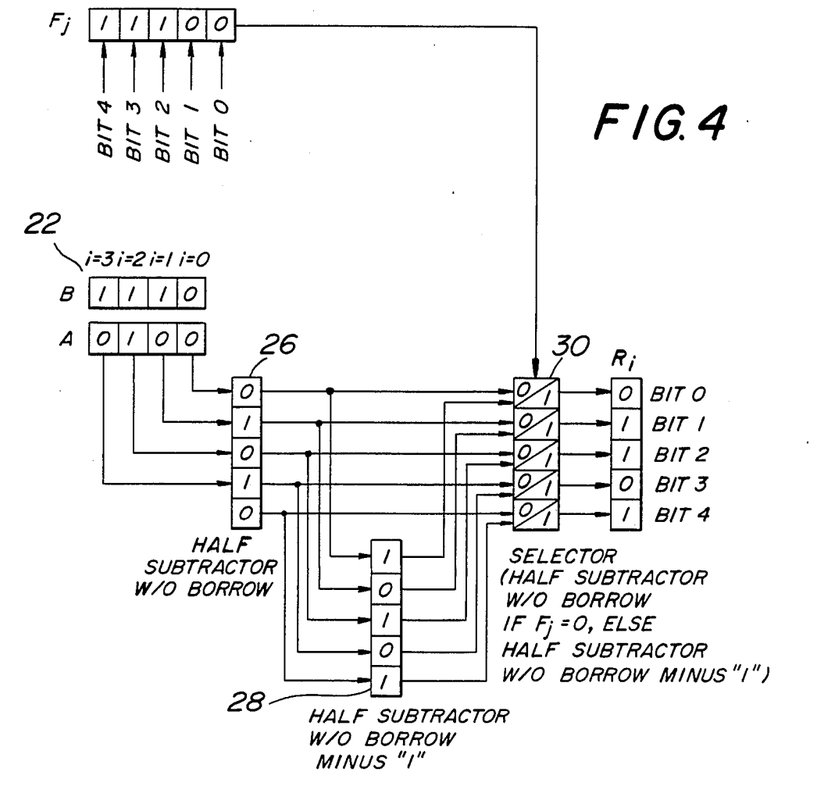
FIG. 4 is a diagram, like that of FIG. 2A but showing the subtraction of one, four bit binary number from a second, four bit binary number.

In FIG. 4 there is shown a diagram similar to FIG. 2A but showing the subtraction of the four bit binary signal B from the four bit binary signal A. As can be seen therein A is the binary number 0100 (representing the decimal value of 4) whereas B is the binary number 1110 (representing the decimal value 14).

As can be seen the subtraction technique is similar to the addition technique described with reference to FIG. 2A except that each $B_i$ bit is subtracted without borrow from the corresponding $A_i$ bit by the half-subtractor without borrow means 26. The result of that operation is operated upon by a half-subtraction without borrow minus one means 28. As will be appreciated by those skilled in the art for binary numbers a half-subtractor without borrow is the same as a half-adder without carry. So too, a half-subtractor without borrow minus one is the same as a halfadder without carry plus one. Hence means 26 and 28, described earlier, are used for the half-subtractor without borrow and the half-subtractor without borrow minus one shown in FIG. 4.

Operation of the means shown in FIG. 4 is as follows: the subtraction without borrow of A-B results in the creation of binary signal string 01010 in means 26. A 1 is subtracted from each bit of that string by means 28 to provide the string 10101. This signal controls selector 30, as also described heretofore, so that the three highest order bits making up the resultant signal R, i.e., bits $R_4$, $R_3$ and $R_2$ are provided by means 28, whereas the two lowest order bits, i.e., bits $R_1$ and $R_0$, are provided by means 26. Accordingly, R=10110.

As will be recognized by those skilled in the art the resultant signal is in two's complement. Moreover, the fact that the highest order bit is a 1 indicates that for the example given the resultant string is a negative number. To determine the absolute value of R=10110, one merely takes the two's complement of it. That is accomplished by taking the one's complement of that string and adding a 1 to it. Thus, the output signal representing the absolute value of A-B is 01010 (10 in decimal) and its sign is negative.

Figure 5:
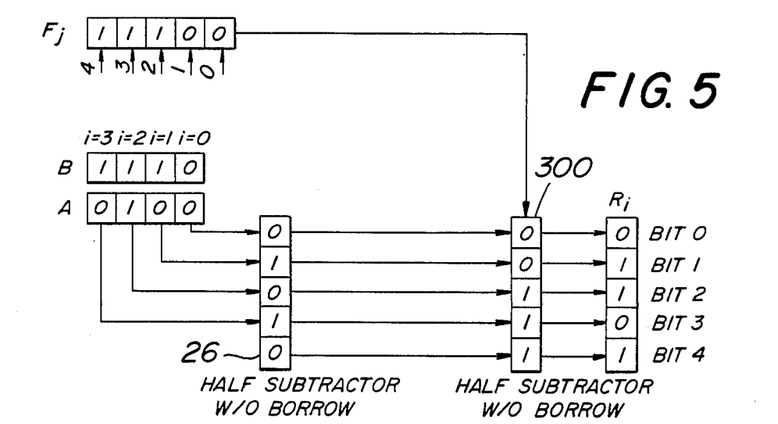
FIG. 5 is a diagram, like that of FIG. 3A but showing the subtraction of one, four bit binary number from a second, four bit binary number.

In FIG. 5 there is shown alternative means like that described with reference to FIG. 3A but shown for subtracting the B signal 1110 from the A signal 0100. In that embodiment a second half subtractor without borrow 300 is utilized. That means is of the same construction as means 26 and is arranged to subtract $F_j$ without borrow from means 26. As will be appreciated such action for binary numbers is equivalent to that produced by a half adder without carry.

The circuitry and method of this invention as described heretofore involve the comparison of the A and B signals to see if B is greater than A or else less than or equal to A as a means for determining the sum of A plus B or the difference of A minus B.

If the circuitry and method of this invention is modified to determine if B is greater than or equal to A, one can readily determine the result of the mathematical operation A+B−1 or A−B−1. To accomplish those mathematical functions conventional equality comparator means (not shown) are utilized in conjunction with the means described heretofore. Thus, the conventional equality comparator is used to compare bits of the B and C strings and to provide a resultant bit string, whose bits are equal to a "1" wherever the $C_i$ and $B_i$ substrings are the same. In addition a "1" is always provided for the lowest order bit. This resulting string which indicates which substrings of C are equal to the corresponding substrings of B is then ORed with the output of the B>C substring comparator means described earlier to provide a resulting signal which is indicative of B≧A. For addition operations this signal is added without carry to the results of the addition of the A and B signals, as described heretofore, the result is a signal equal to A+B+1. For subtraction operations the resulting signal indicative of B≧A is subtracted without borrow from the results of A−B, as described heretofore, to result in the signal equal to A−B−1. As will be appreciated by those skilled in the art the A+B+1 and A−B−1 operations carried out by this invention provide a vehicle for producing high speed program counters and the like.

It must be pointed out at this juncture that other means than 26, 28 and 30 can be utilized in constructing devices in accordance with this invention. In fact for subtraction of decimals or numbers in other than binary number systems, such other means are required, but can be readily designed by those skilled in the art, e.g., multi-level logic devices.

It must also be pointed out at this juncture that while the comparator means 24 shown herein for effecting the substring comparison constitutes the circuitry shown and claimed in my aforementioned copending United States application, other high speed comparators can be utilized, providing such comparators are capable of high speed operation.

As will be appreciated by those skilled in the art the mathematical functions of the multiplication and division can be effected utilizing the teachings herein inasmuch as those two functions can be performed by iterations of the addition/subtraction process.

As will be appreciated from the foregoing the device and method of the subject invention provides a means for effecting high speed mathematical operation by enabling the determination of the resultant columns (digits) of the output signal in any order and not as a function of the number of bits or columns thereof. Such operation has the effect of eliminating the time constraints caused by carry bit propogation of conventional circuits producing mathematical functions.

Moreover, as should be appreciated by those skilled in the art the substring comparison operations on the B and C (base-1 complement) strings yields the same information as traditional look ahead equations. However, the manner that such information is generated utilizing the devices and method of the subject invention is different and lends itself to expeditious hardware implementation. In this regard the implementation of prior art look-ahead techniques requires use of multi-input AND/OR gates of ever increasing input sizes. For high speed circuits it is of considerable importance that the delay at all levels of the circuit be uniform. Unfortunately that is not achievable practically with large multiple input AND gates (which may in themselves require more than one logic level for implementation). Thus, at present only four bit carry look ahead is practical. An example of a four bit adder using look ahead is Texas Instruments Four bit carry-look ahead adder SN74LS283. With the device and method of the subject invention, large multi-input AND gates are not necessary so that the AND functions can be carried out using 2 input AND gates, irrespective of the number of bits in the signals being added or subtracted.

Without further elaboration the foregoing will so fully illustrate my invention that others may, by applying current or future knowledge, readily adapt the same for use under various conditions of service.

I claim:

1. A device for adding or subtracting two signals A and B without producing any bit generate signal, each of said signals being composed of a string of n digits in a number system having a predetermined base, each digit defining a respective column, and wherein $A_i$ represents each digit of the A string, $B_i$ represents each digit of the B string and i represents the specific column number from 0 to n, said device comprising first means for adding the $A_i$ and $B_i$ digits in each of said columns without reference to the result of said addition in any other column when said device is performing said addition operation and for subtracting the $B_i$ digits from said $A_i$ digits in each of said columns without reference to the results of said subtraction in any other column when said device is performing said subtraction operation, second means for providing a C string of n digits, said C string being the complement of said A string in the number system having a base one less than said predetermined base when said device is performing the addition operation and being the same as said A string when said device is performing the subtraction operation, third means for comparing substrings of said B signal to the corresponding length substrings of said C string, and fourth means responsive to said first and third means for providing a resultant output signal R composed of at least n digits $R_i$ and representing the results of said addition or subtraction operation.

2. The device of claim 1 wherein said third means determines whether selected ones of said B substrings are greater in absolute value than corresponding ones of said C substrings or whether said selected B substrings are less than or equal in absolute value to said corresponding C substrings.

3. The device of claim 2 wherein said third means compares all of the substrings of said B and C strings from the ith column to the lowest order column and providing an output signal F composed of at least n digits $F_j$, with $j=i+1$ and wherein the digit in the lowest order column of said F signal is always 0 while each other $F_j$ digit is 1 if the associated B substring is greater than the corresponding C substring, or else said $F_j$ digit is 0.

4. The device of claim 3 wherein when the device is adding a 1 is added without carry to each digit of the summation of $A_i$ and $B_i$ if the corresponding digit $F_j$ is 1, else a 0 is added to each digit of said summation.

5. The device of claim 4 wherein said third means determines whether selected ones of said B substrings are greater in absolute value than corresponding ones of said C substrings or whether said selected B substrings are less than or equal in absolute value to said corresponding C substrings.

6. The device of claim 1 wherein said third means determines whether selected ones of said B substrings are greater in absolute value than corresponding ones of said C substrings or whether said selected B substrings are less than or equal in absolute value to said corresponding C substrings and wherein said third means compares all of the substrings of said B and C strings from the ith column to the lowest order column and providing an output signal F composed of at least n digits $F_j$, with $j=i+1$ and wherein the digit in the lowest order column of said F signal is always 0 while each other $F_j$ digit is 1 if the associated B substring is greater than the corresponding C substring, else said $F_j$ digit is 0.

7. The device of claim 6 wherein when said device is subtracting a 1 is subtracted without borrow from each digit of the difference between $A_i$ and $B_i$ if the corresponding digit $F_j$ is 1, else a 0 is subtracted without borrow from each digit of said subtraction.

8. A method for adding two signals A and B without producing any bit generate signal, each of said A and B signals being composed of a string of n digits in a number system having a predetermined base, each digit defining a respective column, and wherein $A_i$ represents each digit of the A string, $B_i$ represents each digit of the B string and i represents the specific column number from 0 to n, said method comprising the steps of adding the $A_i$ and $B_i$ digits in each of said columns without reference to the results of said addition operation in any other column, providing a C string of n digits, said C string being the complement of said A string in the number system having a base one less than said predetermined base, comparing substrings of said B signal to corresponding length substrings of said C string, and providing in response to the foregoing steps a resultant output signal R composed of at least n digits $R_i$ representing the results of said addition operation.

9. The method of claim 8 wherein said coparison step determines whether selected ones of said B substrings are greater in absolute value than corresponding ones of said C substrings or whether said selected B substrings are less than or equal in absolute value to said corresponding C substrings.

10. The method of claim 9 wherein said comparison step entails the comparison of all of the substrings of said B and C strings from the ith column to the lowest order column and providing an output signal F composed of at least n digits $F_j$, with $j=i+1$ and wherein the digit in the lowest order column of said F signal is always 0 while each other $F_j$ digit is 1 if the associated B substring is greater than the corresponding C substring, else said $F_j$ digit is 0.

11. The method of claim 10 wherein a 1 is added without carry to each digit of the summation of $A_i$ and $B_i$ if the corresponding digit $F_j$ is 1, else a 0 is added to each digit of said summation.

12. A method for subtracting a B signal from an A signal without producing any bit generate signal, each of said signals being composed of a string of n digits in a number system having a predetermined base, each digit defining a respective column, and wherein $A_i$ represents each digit of the A string, $B_i$ represents each digit of the B string and i represents the specific column number from 0 to n, said method comprising the steps of subtracting the $B_i$ digits from said $A_i$ digits in each of said columns without reference to the result of said subtraction operation in any other column, providing a C string of n digits, said C string being the same as said A string, comparing substrings of said B signal to corresponding length of substrings of said C string, and providing in response to said foregoing steps a resultant output signal R composed of at least n digits $R_i$ representing the results of said subtraction operation.

13. The method of claim 12 wherein said comparison step determines whether selected ones of said B substrings are greater in absolute value than corresponding ones of said C substrings or whether said selected B substrings are less than or equal in absolute value to said corresponding C substrings.

14. The method of claim 13 wherein said comparison step entails the comparison of all of the substrings of said B and C strings from the ith column to the lowest order column and providing an output signal F composed of at least n digits $F_j$, with $j=i+1$ and wherein the digit in the lowest order column of said f signal is always 0 while each other $F_j$ digit is 1 if the associated B substrings is greater than the corresponding C substring, else said $F_j$ digit is 0.

15. The method of claim 14 wherein a 1 is subtracted without borrow from each digit of the subtraction of $B_i$ form $A_i$ if the corresponding digit $F_j$ is 1, else a 0 is added to each digit of said subtraction.

* * * * *